(12) United States Patent
Rapps et al.

(10) Patent No.: US 8,059,490 B2
(45) Date of Patent: Nov. 15, 2011

(54) ULTRASONIC SENSOR

(75) Inventors: Peter Rapps, Karlsruhe (DE); Hans Lubik, Bodelshausen (DE); Oliver Hartig, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 11/992,202

(22) PCT Filed: Aug. 11, 2006

(86) PCT No.: PCT/EP2006/065244
§ 371 (c)(1),
(2), (4) Date: Apr. 9, 2009

(87) PCT Pub. No.: WO2007/033869
PCT Pub. Date: Mar. 29, 2007

(65) Prior Publication Data
US 2009/0211360 A1    Aug. 27, 2009

(30) Foreign Application Priority Data

Sep. 21, 2005  (DE) .......................... 10 2005 045 019

(51) Int. Cl.
G01N 29/11   (2006.01)
B06B 1/00    (2006.01)
(52) U.S. Cl. ........................ 367/140; 367/902
(58) Field of Classification Search .................. 367/140, 367/902, 909; 73/599
See application file for complete search history.

(56) References Cited

U.S. PATENT DOCUMENTS

| 3,489,679 | A | * | 1/1970 | Forrest et al. | 210/748.05 |
| 4,450,430 | A |   | 5/1984 | Barishpolsky | |
| 5,189,914 | A |   | 3/1993 | White et al. | |
| 6,282,969 | B1 |  | 9/2001 | Daniel | |
| 2009/0211360 | A1 | * | 8/2009 | Rapps et al. | 73/599 |

FOREIGN PATENT DOCUMENTS

WO    WO 2007033869 A2 *  3/2007

* cited by examiner

*Primary Examiner* — Daniel Pihulic
(74) *Attorney, Agent, or Firm* — Kenyon & Kenyon LLP

(57) ABSTRACT

An ultrasonic sensor having a diaphragm includes a heating element for heating the diaphragm.

7 Claims, 3 Drawing Sheets

ULTRASONIC SENSOR

BACKGROUND INFORMATION

Ultrasonic sensors are known in which a diaphragm is excited to vibration by ultrasonic waves. The sound waves are converted to an electrical signal by an electroacoustic transducer, for example a piezoelectric element, enabling the signal to be evaluated. In particular when used outdoors, the operation of the ultrasonic sensor may be impaired at low temperatures, for example by ice or snow, if the diaphragm of the ultrasonic sensor is covered thereby. The sound may be absorbed by snow. An ice covering may reduce the diaphragm's ability to vibrate. Furthermore, the ice covering on other components may also cause sound waves to become decoupled, so that the system sensitivity as a whole is reduced. An ultrasonic sensor which is inserted into a holder is described in U.S. Pat. No. 6,282,969. The holder includes a heating element which is used to heat the ultrasonic transducer and, in particular, also the diaphragm. Ice and snow, which may accumulate in front of the ultrasonic sensor holder, are melted thereby.

SUMMARY OF THE INVENTION

The ultrasonic sensor according to the present invention has the advantage over the related art that the ultrasonic sensor itself includes a heating element for heating the diaphragm. This enables the mechanical structure to be simplified, since the heating element is integratable into the ultrasonic sensor along with the rest of the electronics. Furthermore, the heating efficiency may be increased, since the ultrasonic sensor, i.e., the diaphragm itself, is heated. This makes it possible to quickly provide a system's functionality, in particular when starting an ice-covered vehicle.

It is particularly advantageous to use an ultrasonic sensor having a transducer pot, since not only optimum receiving characteristics of the ultrasonic sensor may be ensured thereby, but the diaphragm may also be heated via the transducer pot.

It is furthermore advantageous to provide the heating element in the transducer pot. In this case, the heating element may be either provided in the pot interior or introduced into the body of the transducer pot itself. This ensures a space-saving arrangement of the heating element, while simultaneously enabling it to be mounted more easily and positioned closer to the diaphragm.

In a further specific embodiment, the heating element may also, if necessary, be integrated into the diaphragm itself. This achieves a particularly high degree of heating efficiency.

A particularly simple embodiment of a heater is provided by an ohmic resistance heater. In a further specific embodiment, the heating element may also be designed as an eddy-current heater. By inductively transferring the heating energy in the case of the eddy-current heater, it is possible to eliminate a direct electrical contacting between the heating element and the diaphragm, i.e., the transducer pot.

To be able to utilize the heating energy efficiently, on the one hand, and to avoid overheating the ultrasonic sensor, on the other hand, it is advantageous to provide a temperature measurement unit for measuring the temperature of the ultrasonic sensor.

It is also advantageous to provide a regulating unit for regulating the heating element. The heating element may be operated at a desired heating capacity as a function of the temperature in particular. It is also advantageous to integrate the regulating unit into an evaluation unit for evaluating the sensor. This ensures a particularly simple electronic construction.

It is particularly advantageous to use an ultrasonic sensor according to the present invention for measuring distance in a motor vehicle. In particular in a motor vehicle, icing or snowfall occur from time to time during vehicle operation, but also after parking the vehicle. The distance measurement is intended to alert a driver to obstacles in the vehicle's surroundings. By advantageously heating the diaphragm according to the present invention, it is possible to ensure a functionality of the distance measurement even at low temperatures, in particular quickly after starting the vehicle.

DETAILED DESCRIPTION

The ultrasonic sensor according to the present invention may be used for any ultrasonic measurements. Its use is practical, in particular, when the sensor is in danger of being covered by snow or ice during measurement. This is the case, in particular, when used outdoors, for example during wind measurement or distance measurement outdoors. Its use is advantageous, in particular, for ultrasonic distance sensors which are situated on vehicles and which measure the distance to obstacles in the vehicle's surroundings. The present invention is therefore explained below on the basis of an example of an ultrasonic distance sensor on a vehicle. The ultrasonic sensor in this case may act only as an ultrasonic receiver which receives ultrasonic waves originating from a different source. In a preferred specific embodiment, however, particularly when used in a vehicle, the ultrasonic sensor also acts as an ultrasonic transmitter which, in this case, emits ultrasonic waves in a first operating mode, receives reflected ultrasonic waves in a second operating mode, and enables the received ultrasonic waves to be evaluated. A distance measurement is carried out in such a way that the radiated ultrasonic waves are reflected by an obstacle, and the propagation time of the reflected ultrasonic signal is measured by determining the difference between the time that the signal is emitted and the time that the reflected signal is received. The distance to the obstacle may be determined from the propagation time, taking into account the sonic velocity.

Figure 1:
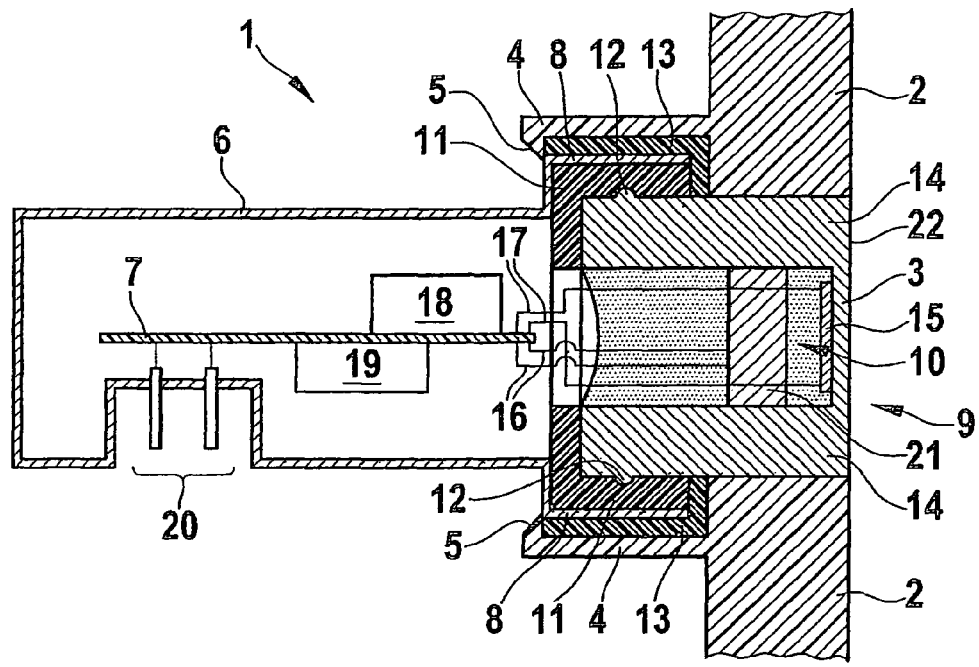
FIG. 1 shows a sectional side view of an ultrasonic sensor according to the present invention, built into the bumper of a motor vehicle.

FIG. 1 shows an ultrasonic sensor 1 according to the present invention, which is mounted on a bumper 2 of a motor vehicle in such a way that a diaphragm 3 for receiving and preferably also transmitting ultrasonic signals faces the outside of the vehicle. On the inside of bumper 2, brackets 4 are molded onto bumper 2 and surround ultrasonic sensor 1 in an annular manner and preferably hold the sensor on bumper 2 via latching hooks 5 molded onto brackets 4. Ultrasonic sensor 1 includes a housing 6 in which a p.c. board 7 is situated. On the side facing bumper 2, housing 6 also includes retaining elements 8 which encompass a sensor transducer pot 9. A decoupling ring 11, with which projections 12 of sensor transducer pot 9 engage, is preferably situated between retaining elements 8 and sensor transducer pot 9. This holds sensor transducer pot 9 in decoupling ring 11. A hood 13 surrounds decoupling ring 11 in an annular manner, holding sensor transducer pot 9 in decoupling ring 11, which, in turn, is held against retaining elements 8 by hood 13.

Sensor transducer pot 9 has pot walls 14 which are generally many times thicker than diaphragm 3 and are molded onto projections 12. Sensor transducer pot 9 has a pot interior 10 which has a round, elliptical or, possibly, also a rectangular cross section. An electroacoustic transducer, in particular a piezoelectric element 15, is situated on diaphragm 3 in pot interior 10. In a preferred specific embodiment, pot interior 10 is filled with a casting compound, which is illustrated by the dotted area in FIG. 1. Piezoelectric element 15 is connected to p.c. board 7 via electrical contact lines 17. Electronic components 18, 19, which on the one hand are used to induce piezoelectric element 15 to emit sound and thereby excite diaphragm 3 to vibration so that it emits ultrasonic signals, are situated on p.c. board 7. Electronic components 18, 19 are also designed to evaluate the sound signals emitted by piezoelectric element 15 as a result of an excitation of diaphragm 3 to vibration as a result of received ultrasonic signals. Power is supplied to ultrasonic sensor 1 via a plug connector 20. Plug connector 20 is designed in such a way that ultrasonic sensor 1 may also be controlled or measuring data transmitted via plug connector 20. In the manner according to the present invention, ultrasonic sensor 1 includes a heating element 21 which is also connected to p.c. board 7 via lines 16. Heating element 21 is activated by electronic components 18, 19 on p.c. board 7. If a current flows through heating element 21, the heating element heats up and gives off its heat to its surroundings. In the specific embodiment illustrated in FIG. 1, pot interior 10 of sensor transducer pot 9 is heated. The heat also flows to diaphragm 3, so that diaphragm 3 also heats up. This enables snow or ice situated on outside 22 of diaphragm 3 to be melted.

Figure 2:
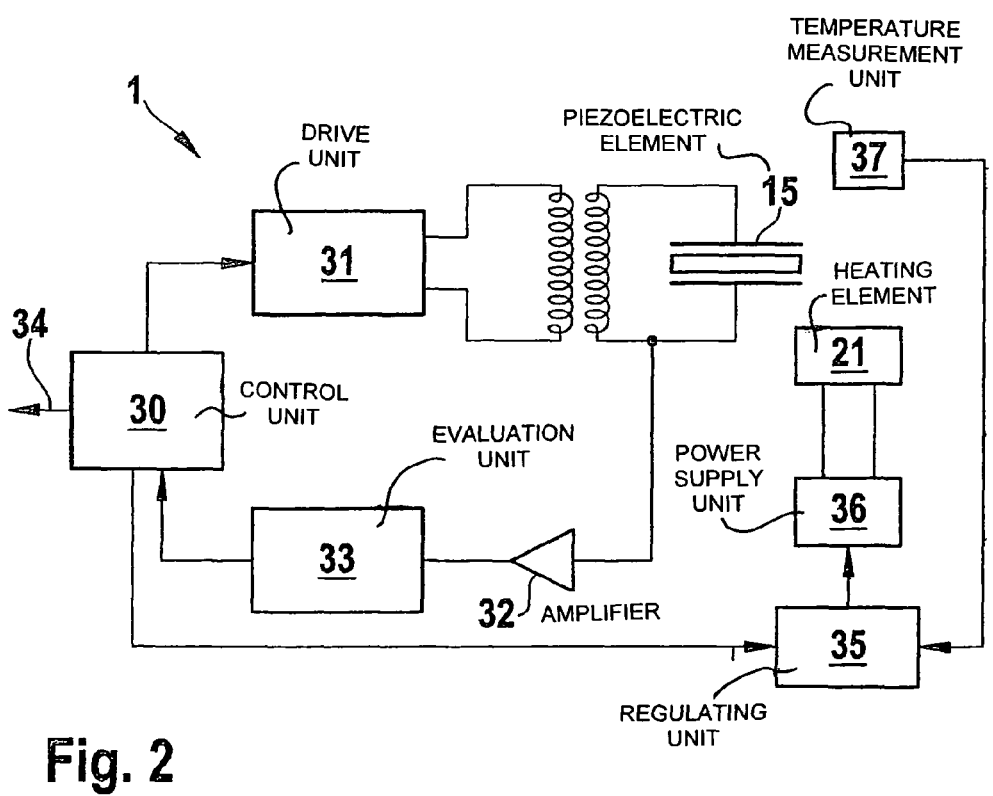
FIG. 2 shows a schematic circuit diagram of an ultrasonic sensor according to the present invention.

FIG. 2 shows a detail of the electronic layout of ultrasonic sensor 1 according to FIG. 1. Ultrasonic sensor 1 has a control unit 30 which provides an excitation signal for piezoelectric element 15 via a drive unit 31. For this purpose, drive unit 31 has an oscillator for generating an a.c. signal, the a.c. signal being amplified and increased via a transformer to a voltage required for the piezoelectric element. Piezoelectric element 15 is thus able to emit a signal. Ultrasonic sensor 1 also includes an amplifier 32 which amplifies the voltage signal emitted by piezoelectric element 15 in a receiving mode, based on an excitation of diaphragm 3 by received ultrasonic signals. This signal is subsequently supplied to an evaluation unit 33 in which the received signal is preferably filtered and subsequently compared with a preset threshold value. The threshold value comparison is used to determine whether a reflected signal is actually received—by the threshold value being exceeded—or whether only noise is received—by the threshold value not being reached. A reception of a reflected signal is forwarded by evaluation unit 33 to control unit 30. If control unit 30 determines that a reflected signal is present, this information is transmitted via an output 34, via connector 20, to a centrally positioned control circuit (not illustrated in FIG. 1) of an overall distance measurement system.

In a first specific embodiment, control unit 30 also compares the received signal with respect to its amplitude with the amplitude at which signals are usually reflected. The amplitude of the noise signal may also be evaluated. If the control circuit thus determines that the amplitude of the received signal and/or the noise is regularly lower than usual by a predefined amount, it is possible that the ultrasonic sensor is covered with ice. For this purpose, control unit 30 may activate a regulating unit 35, which controls a power supply unit 36 of the heating element. Regulating unit 35 then ensures that power supply unit 36 of heating element 21 is supplied with an operating voltage, and heating element 21 thus heats the ultrasonic sensor, in particular heats the diaphragm in the region of piezoelectric element 15.

As an alternative or in addition to a signal evaluation system, a temperature measurement unit 37 is also provided, which is preferably situated in the region of diaphragm 3. In a first specific embodiment, temperature measurement unit 37 is evaluated by regulating unit 35. In a further specific embodiment, temperature measurement unit 37 may also be evaluated by control unit 30 to take into account the measured temperature for influencing the sonic velocity. The temperature measurement unit is preferably designed as a temperature-dependent resistor, for example as an NTC or PTC element. Regulating unit 35 may then activate a heater as a function of the temperature, for example when a measured temperature reaches or drops below +2° C. In a further specific embodiment, the plausibility of a possible icing may be established upon a decrease in amplitude by comparison with a measured temperature value from another temperature sensor situated on the vehicle.

Figure 3:
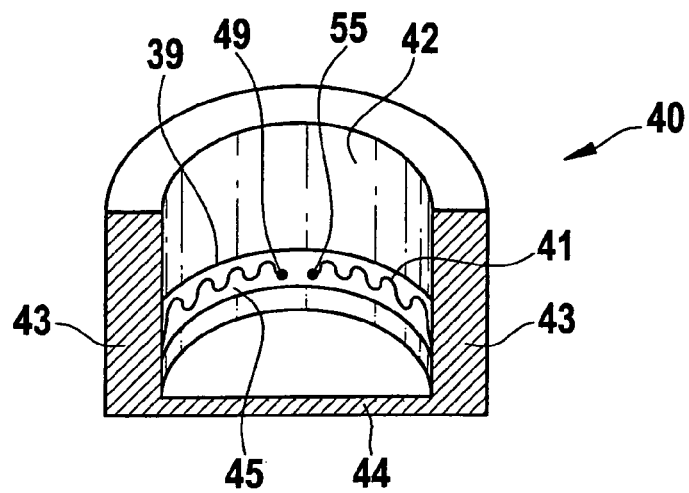
FIGS. 3 through 7 show exemplary embodiments of various ultrasonic sensors having different heating elements.

FIGS. 3 through 7 show examples of embodiments of the heating element according to the present invention. FIG. 3 shows a transducer pot 40 in which the heating element is situated in the form of a heating wire 41 on an inside 42 of side wall 43 of transducer pot 40. Heating wire 41 has a first terminal 49 and a second terminal 55, power supply unit 36 applying a voltage to the heating wire via corresponding contacts, which are not illustrated in FIG. 3. Through these means, a current—either d.c. or a.c. current—is conducted through heating wire 41. This heats heating wire 41, the heat being transferred to walls 43 of transducer pot 40. Due to heat conduction, the heat flows from walls 43 to vibration diaphragm 44, heating and thawing the latter. In an embodiment of this type, good heat conduction, in particular, is achieved by a transducer pot made of metal. Accordingly, the transducer pot may, however, also be made of a ceramic or a plastic material. In the case of a metallic sensor transducer pot, the heating wire must be mounted on wall 43 in such a way that it is insulated against the sensor transducer pot.

In another specific embodiment, a foil heating element may be used instead of a heating wire. The foil heating element, for example, includes a polyamide foil into which a copper path is glued. A foil heating element 45 is attachable in the same manner as the attachment of the heating wire, a dimension of a foil 39 of foil heating element 45 being drawn as broken lines in FIG. 3 as an alternative specific embodiment.

Figure 4:
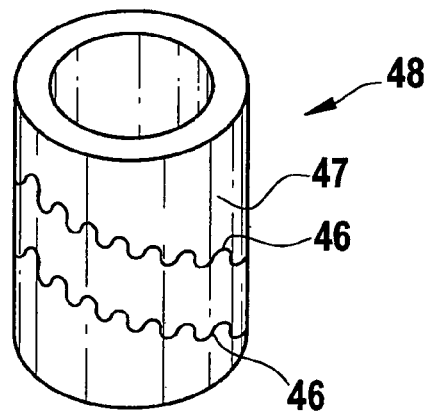

FIG. 4 shows a further specific embodiment, in which a heating wire 46 is situated on an outside 47 of a transducer pot 48. Heating wire 46 may also be mounted on outside 47 of transducer pot 48 in the form of a foil element. To heat the walls on the outside 47, the diaphragm of transducer pot 48 is heated.

Figure 5:
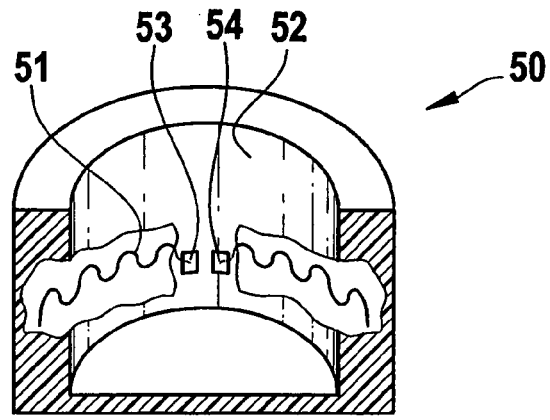

FIG. 5 shows a further specific embodiment of a heating element, sensor transducer pot 50 being made, in particular, of a plastic material, into the interior of which a heating wire 51 is introduced during the manufacture of sensor transducer pot 50, for example by casting. In particular, sensor transducer pot 50 has electrical contacts 53, 54 on its inside 52 for applying a voltage to heating wire 51. Heating wire 51 may pass through the walls of sensor transducer pot 50 in one or more windings.

Figure 6:
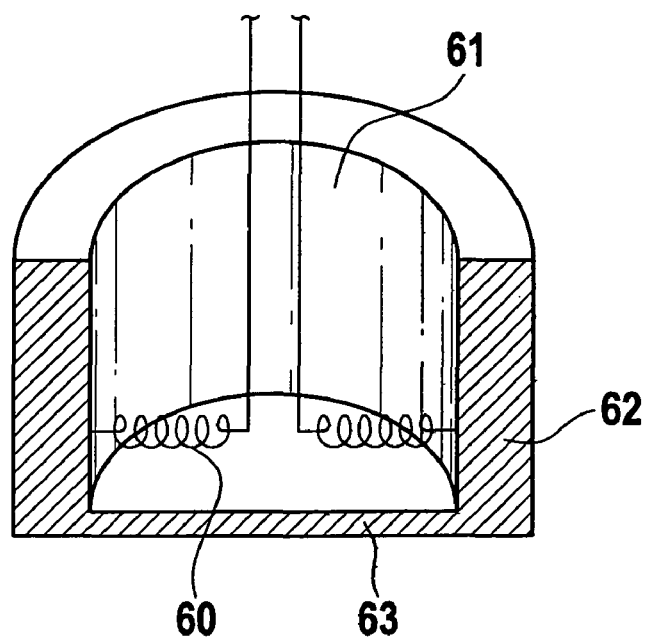
Figure 7:
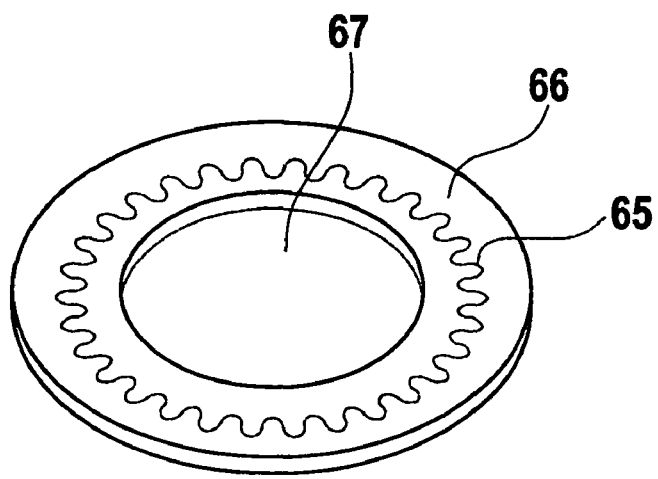

FIG. 6 shows a further specific embodiment of an ultrasonic sensor, in which an inductive heating element is provided in the form of an inductor 60. Inductor 60 is activated by an a.c. voltage. It is preferably situated in interior 61 of sensor transducer pot 62. Sensor transducer pot 62 is made of metal, so that the inductor induces an eddy current in the metal of sensor transducer pot 62 when the a.c. current is applied. This heats sensor transducer pot 62 and thus diaphragm 63.

In a further specific embodiment, a heating element, for example a heating wire 65, may also be introduced directly into diaphragm 66 or mounted on the inside thereof. In a preferred specific embodiment, heating wire surrounds piezoelectric element 67. On the one hand, this system is possible in the case of a diaphragm which forms the bottom of a sensor transducer pot. However, it may be used even if the diaphragm is given a flat design and no sensor transducer pot is provided, or another molded part is provided instead of the sensor transducer pot.

What is claimed is:

1. An ultrasonic sensor comprising:
   a transducer pot having a floor formed as a diaphragm; and
   a heating element for heating the diaphragm, wherein the heating element is integrated into the diaphragm.

2. The ultrasonic sensor according to claim 1, wherein the heating element is a resistance heater.

3. The ultrasonic sensor according to claim 1, wherein the heating element is an eddy-current heater.

4. The ultrasonic sensor according to claim 1, further comprising a temperature measurement unit for measuring a temperature of the ultrasonic sensor.

5. The ultrasonic sensor according to claim 1, further comprising a regulating unit for regulating a heating of the heating element.

6. The ultrasonic sensor according to claim 5, wherein the regulating unit is integrated into an evaluation unit for evaluating the sensor.

7. The ultrasonic sensor according to claim 1, wherein the sensor is used for measuring distance in a motor vehicle.

* * * * *